United States Patent [19]

Shinbo et al.

[11] 4,170,516
[45] Oct. 9, 1979

[54] METHOD OF OPERATING A NUCLEAR REACTOR

[75] Inventors: Katsutoshi Shinbo, Katsuta; Takanori Hosokawa, Hitachi, both of Japan

[73] Assignee: Hitachi, Ltd., Japan

[21] Appl. No.: 674,690

[22] Filed: Apr. 7, 1976

[30] Foreign Application Priority Data

Apr. 7, 1975 [JP] Japan .................................. 50-41302

[51] Int. Cl.² .............................................. G21C 7/00
[52] U.S. Cl. ..................................... 176/20 R; 176/24
[58] Field of Search ...................... 176/19 R, 20 R, 22, 176/24, 38, 73, 74, 50

[56] References Cited

U.S. PATENT DOCUMENTS

| | | | |
|---|---|---|---|
| 3,042,600 | 7/1962 | Brooks | 176/20 R |
| 3,183,166 | 5/1965 | Schweitzer et al. | 176/38 |
| 3,926,721 | 12/1975 | Lysell | 176/38 |
| 4,057,466 | 11/1977 | Thompson et al. | 176/20 R |

OTHER PUBLICATIONS

Nuclear Engineering Handbook, Etherington ed., McGraw-Hill Book Co., Inc., N.Y., N.Y. (1958) pp. 8-29-8-31.

Primary Examiner—Samuel W. Engle
Assistant Examiner—S. A. Cangialosi
Attorney, Agent, or Firm—Craig and Antonelli

[57] ABSTRACT

In raising the power of a nuclear reactor, before the linear heat generating rate of nuclear fuel elements arranged in the core of the nuclear reactor reaches 240 W/cm, the power rise of the reactor is suspended at least once and the reactor power is held at the fixed level. The raise of the power of the nuclear reactor before the arrival of the linear heat generating rate at 240 W/cm is performed by pulling out control rods inserted into the core. When the linear heat generating rate exceeds 240 W/cm, the power of the nuclear reactor is gradually raised in such a way that the linear heat generating rate is increased in a proportion of below about 1.8 W/cm/hour by increasing the flow rate of a coolant supplied to the core.

34 Claims, 11 Drawing Figures

METHOD OF OPERATING A NUCLEAR REACTOR

BACKGROUND OF THE INVENTION

This invention relates to a method of operating a nuclear reactor, and more particularly to a method of operating a nuclear reactor which is in less danger of the failure of nuclear fuel elements.

Hereunder, a method of operating a boiling water reactor will be described as an example. In the prior art method of operating the nuclear reactor, no special stipulation is made as to the power rise before the linear heat generating rate of nuclear fuel elements arranged in the core of the reactor (hereinbelow, simply termed the "linear heat generating rate") reaches about 240 W/cm. Where the nuclear reactor is operated at a linear heat generating rate of about 240 W/cm or above, provisions as stated below are made from the standpoint of preventing the failure of the nuclear fuel elements. When the linear heat generating rate is raised to or above about 240 W/cm for the first time, the power is gradually raised in a raising proportion of below about 1.8 W/cm/hour by the control of the flow rate of a recycling system. When the reactor power has been held constant at the linear heat rate of or above about 240 W/cm for about 12 hours, it is said that preconditioning has been made. Below the linear heat generating rate having been once preconditioned, the power rise can be carried out in a raising proportion of below (about 15% of the total power)/minute with preference taken of the flow rate control. Where the preconditioning is not made, control rods cannot be pulled out at the linear heat generating rate of or above about 240 W/cm.

It has been thought that, when the power of the nuclear reactor is raised as stated above, no failure of the nuclear fuel elements will occur. As described later, however, we have confirmed that the nuclear fuel elements are in danger of failure even below 240 W/cm.

SUMMARY OF THE INVENTION

It is an object of this invention to suppress the failure of nuclear fuel elements arranged in a core in a nuclear reactor.

Another object of this invention to suppress the failure of nuclear fuel elements arranged in a core in a nuclear reactor when the power of the nuclear reactor is raised.

Still another object of this invention is to suppress the failure of nuclear fuel elements arranged in a core in a nuclear reactor when, after suspending the reactor operation, the nuclear reactor is restarted to raise the power thereof.

Yet another object of this invention is to provide a method of operating a nuclear reactor which can simply achieve the suppression of the failure of nuclear fuel elements arranged in a core in the nuclear reactor.

A feature of this invention resides in that, when the power of a nuclear reactor is raised, the power rise of the nuclear reactor is suspended at least once to hold the power of the nuclear reactor at the fixed level before the linear heat generating rate of nuclear fuel elements located in a core in the nuclear reactor reaches about 240 W/cm. Thus, the failure of the nuclear fuel elements arranged in the core can be suppressed.

Another feature of this invention resides in that, when a nuclear reactor is restarted and has its power raised after shutdown thereof, the power of the nuclear reactor is held at a fixed level at least once within a range not exceeding a linear heat generating rate corresponding to the shutdown time of the nuclear reactor. Thus, a radiation damage which is caused in fuel pellets by suspending the operation of the nuclear reactor can be recovered, and the failure of nuclear fuel elements can be suppressed. Preferably, the power of the nuclear reactor is held at a fixed level at least once in a range of linear heat generating rates as satisfies:

$$P \leq P_o \left(1 - \frac{\ln T_s}{\ln T_{so}}\right)$$

where P denotes the linear heat generating rate at which the nuclear fuel elements packed in a core in the nuclear reactor initiate the Pellet-Clad-Mechanical-Interaction (hereinafter, shortly termed PCI), $T_s$ denotes the shutdown period of the nuclear reactor, $P_o$ denotes the linear heat generating rate which makes the nuclear fuel elements cause the PCI for the first time when the nuclear reactor is restarted, and $T_{so}$ denotes the shutdown period of the nuclear reactor at P=0.

DESCRIPTION OF THE PREFERRED EMBODIMENT

Figure 1:
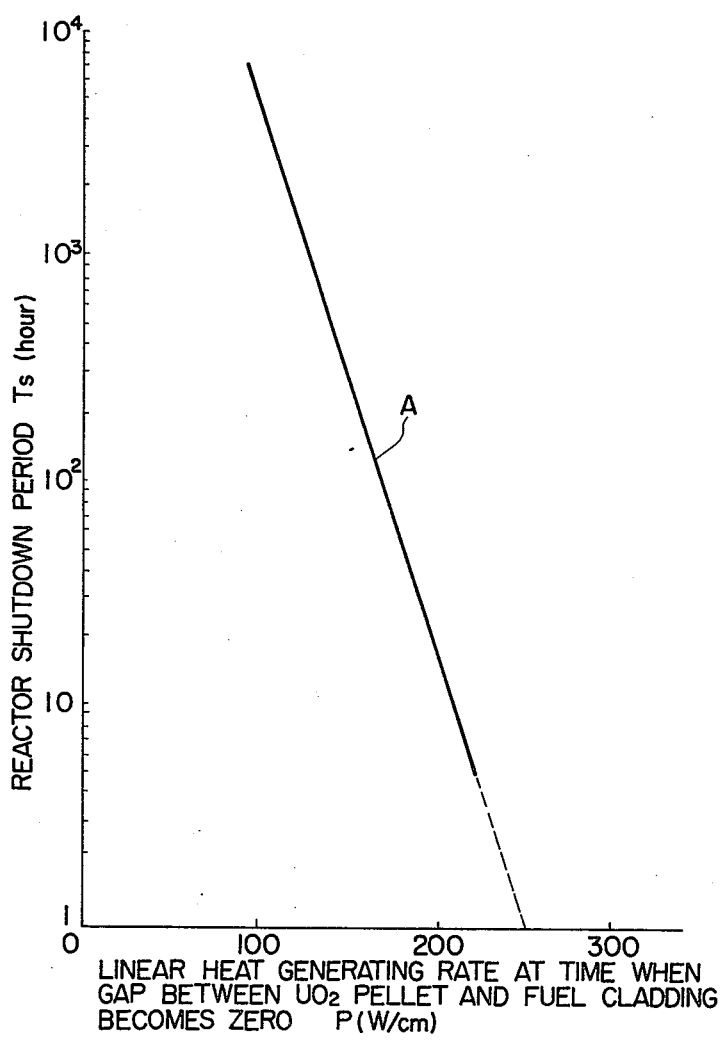
FIG. 1 is a characteristic diagram showing the relationship between the linear heat generating rate initiating the PCI and the reactor shutdown period.
Figure 2:
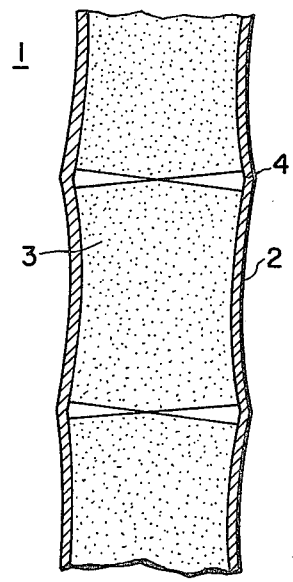
FIG. 2 is a vertical sectional view of a nuclear fuel element showing the state of deformation due to the PCI.

We studied in detail and conducted experiments on the failure of nuclear fuel elements at linear heat generating rates of and below about 240 W/cm. As the result, it has been confirmed that there is the danger of the occurrence of the failure of the nuclear fuel elements even at the linear heat generating rates of and below about 240 W/cm. This invention has been made on the basis of such result, and the experimental result is shown in FIG. 1. FIG. 1 illustrates the relationship between the shutdown period of a nuclear reactor and the linear heat generating rate at which the nuclear fuel elements initiate the PCI. Here, the PCI will be briefly explained. The nuclear fuel element is so constructed that a large number of columnar $UO_2$ pellets are packed in a pile within a fuel cladding and that both ends of the fuel cladding are tightly covered with end plugs. When the core of a nuclear reactor is loaded with the nuclear fuel elements and the operation of the nuclear reactor is initiated, the $UO_2$ pellets become higher in temperature than the fuel cladding. Due to the thermal expansion of the $UO_2$ pellet and to the accumulation therein of fission products produced with burn-up, the volume of the $UO_2$ pellet expands. On the basis of this cause, the sectional area of the $UO_2$ pellet in a direction orthogonal to the axis thereof increases at both the end parts, and the fuel cladding is outspread by the $UO_2$ pellet. Such phenomenon is called the PCI, and it induces a deformation like a bamboo joint (the deformed part is called a ridge part 4) in the fuel cladding (zircalloy fuel cladding) 2 as illustrated in FIG. 2. In FIG. 2, numeral 1 designates the nuclear fuel element, and numeral 3 the $UO_2$ pellet (fuel pellet). When the ridge part 4 arises in the fuel cladding 2 due to the PCI, the danger of the failure of the fuel cladding rises.

FIG. 1 indicates that there is the danger of the occurrence of the failure in the nuclear fuel element even at the linear heat generating rate of or below about 240 W/cm, and that it is also influenced by the shutdown period of the nuclear reactor. The right side with respect to a straight line A is a region in which the PCI arises, whereas the left side is a safe region in which the PCI does not arise. In case of operating the nuclear reactor, especially raising the power, it is desired to rely on the safe region on the left side with respect to the straight line A.

Figure 3:
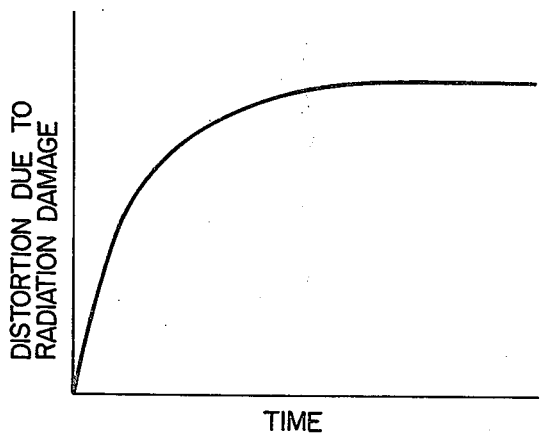
FIG. 3 is a characteristic diagram showing the distortion characteristic of $UO_2$ pellets due to a radiation damage.

In general, when uranium (U), plutonium (Pu) or americium (Am) which is radioactive and fissionable, or a metallic oxide, a metallic carbide or a metallic nitride containing such element is let to stand at the normal temperature, there is observed a phenomenon which, as shown in FIG. 3, it sustains a damage due to radioactive rays and a crystal lattice is distorted. That is, there develops a phenomenon in which one uranium element constituting the crystal lattice of uranium has its position shifted by irradiaton by neutrons, whereby the crystal lattice is outspread and the volume of uranium is increased. it is known that a similar phenomenon develops also in case of a polycrystalline sintered compact made of the aforementioned substances. The quantity of distortion due to the radiation damage differs to some extent in dependence on the kind of the substance. When a specific substance is considered, the period of time in which the quantity of saturation distoration is reached differs in dependence on the disintegration constant of a radioactive substance contained in the specific substance, the kind and energy level of radioactive rays, etc., but the quantity of saturation distortion is considered to be determined by the substance. For example, when a metallic oxide containing uranium-238 such as $UO_2$, $PuO_2$ and $UO_2$—$PuO_2$ is let to stand, it sustains a distortion due to the radiation damage by approximately 0.2–0.3% in one year or so. However, where such material is fissioned in the nuclear reactor, a large number of fission products emitting radioactive rays at very high energy are accumulated in the material. For this reason, the quantity of saturation distortion is sufficiently reached within the shutdown period of the nuclear reactor during which it is cooled to a temperature of below 100° C. after the irradiation. Such phenomenon is defined as the self-irradiation damage.

The occurrence of the distortion due to the radioactive rays given forth by the disintegration of the material itself is termed the self-irradiation damage, while the occurrence of the distortion due to external radioactive rays is generally called the radiation damage. When the power of the nuclear reactor lowers and the temperature of the $UO_2$ pellet becomes low, the $UO_2$ pellet is distorted due to the irradiation by the radioactive rays ascribable to its own disintegration and the external radioactive rays. Accordingly, the expression "radiation damage" in this specification shall cover both the self-irradiation damage and the radiation damage ascribable to the irradiation by the external radioactive rays.

Let it be supposed that the zircalloy cladding—$UO_2$ pellet type nuclear fuel element stated above is irradiated in the nuclear reactor for a certain period of time, whereupon the nuclear reactor is shut down. Since the $UO_2$ pellet 3 is cooled to several tens degrees in Celsius during the period of the shutdown, it sustains the self-irradiation damage in a short time due to radioactive rays from a variety of fission products accumulated in the $UO_2$ pellet. The diameter of the $UO_2$ pellet expands by 0.2–0.3% on account of the radiation damage. In case of the $UO_2$ pellets packed in an integral fuel assembly (for the boiling water reactor) in which the nuclear fuel elements 1 are arrayed in 7 rows and 7 columns, the expansion of the aforecited percentage corresponds to the fact that the $UO_2$ pellet diameter increases by about 25–35 $\mu$m. Accordingly, the gap between the $UO_2$ pellet 3 and the fuel cladding 2 is gradually narrowed from immediately after the shutdown of the nuclear reactor. Therefore, the power at which the PCI begins to occur differs in dependence on the shutdown period of time previous to the start-up of the nuclear reactor. For this reason, the experimental result indicated in FIG. 1 is obtained.

Figure 4:
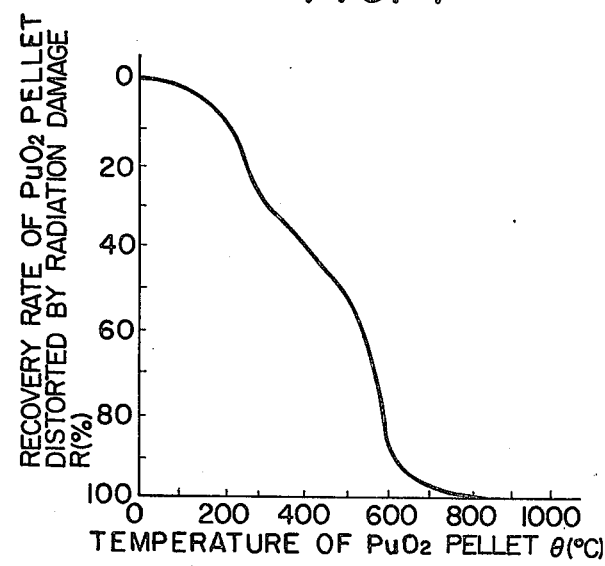
FIG. 4 is a characteristic diagram showing the relationship between the temperature of $PuO_2$ pellets and the radiation damage recovery percentage of the $Pu_2$ pellets.
Figure 5:
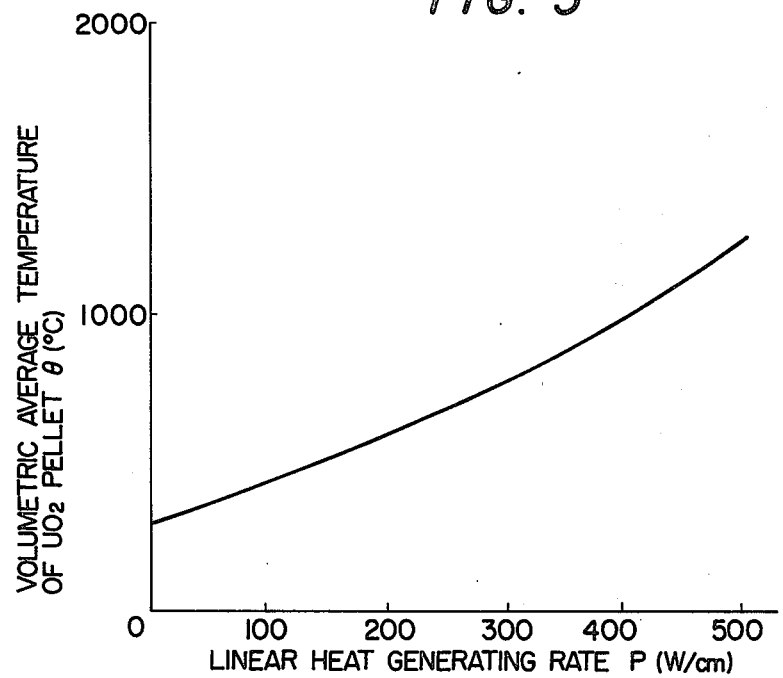
FIG. 5 is a characteristic diagram showing the relationship between the linear heat generating rate and the volumetric average temperature of $UO_2$ pellets.

The radiation damage is deemed to be the distortion of a crystal lattice. There is noted a phenomenon in which it is recovered as the temperature of the $UO_2$ pellet is made high. FIG. 4 illustrates the recovery characteristic of a $PuO_2$ crystal. By way of example, where $PuO_2$ having been damaged to the saturation distortion at the normal temperature is held at 300° C., the amount of saturation distortion is recovered by about 30%. In case of 500° C., it is recovered by about 50%. The period of time required for the recovery becomes shorter as the temperature of the $UO_2$ pellet is higher. The holding time t necessary for the perfect recovery at the temperature $\theta$ of the substance can be approximated by the linear function of the temperature $\theta$ of the substance. $t = -K_1\theta + K_2$ where $K_1$ is a constant determined by the substance and $K_2$ is a constant. Since Pu comes to be produced in the $UO_2$ pellet under irradiation, it may substantially be considered that a solid solution consisting of UO₂ and PuO₂ is formed in the nuclear reactor. The self-irradiation damages of PuO₂ and UO₂—PuO₂ are similar, so that FIG. 4 is also applicable to the case of the irradiated UO₂ pellet from the viewpoint of the recovery phenomenon. The temperature (volumetric average temperature) of the UO₂ pellet and the linear heat generating rate have a relationship as shown in FIG. 5.

Accordingly, a new method of operating a nuclear reactor which checks the nuclear fuel element from giving rise to the PCI and thus prevents the failure of the nuclear fuel element can be provided by taking into consideration the radiation damage as well as the recovery phenomenon in the range of linear heat generating rates of fuel not exceeding about 240 W/cm (the range in which the temperature of the UO₂ pellet does not exceed about 670° C.), which range has not been taken into account in the prior-art method of operating a nuclear reactor. That is, the nuclear reactor is operated in the region of FIG. 1 on the left side with respect to the straight line A.

Figure 6:
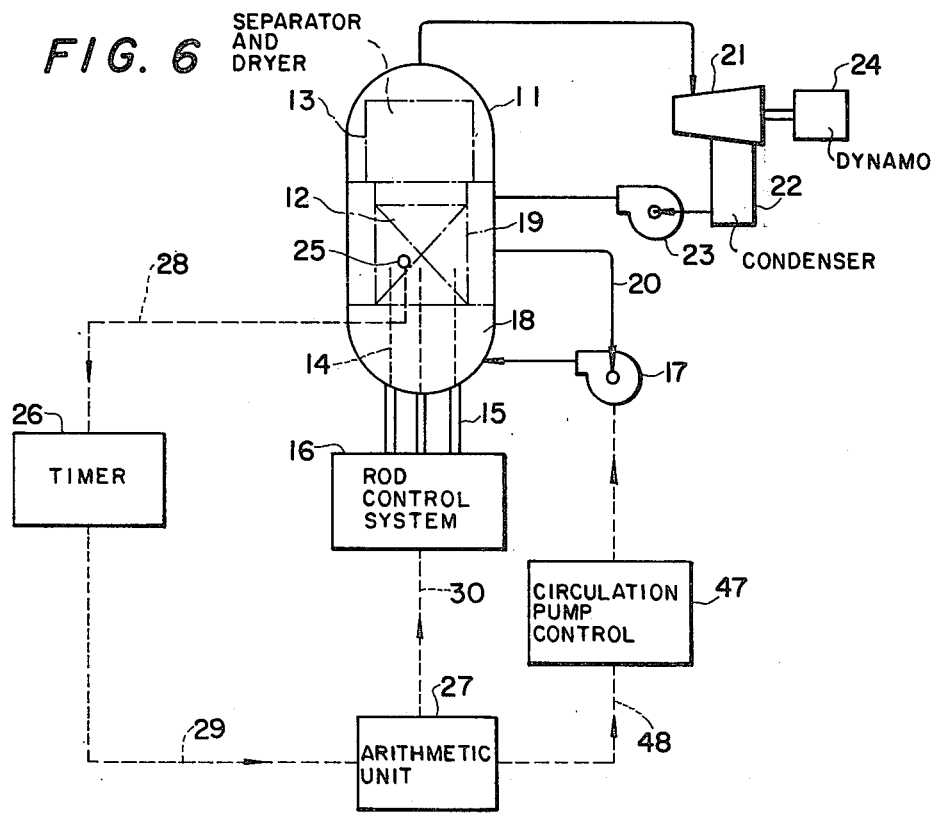
FIG. 6 is a flow diagram of a nuclear reactor suitable for applying the method of operating a nuclear reactor which is one preferred embodiment of this invention.

A preferred embodiment of this invention will be described hereunder with reference to FIGS. 6 to 11. FIG. 6 shows the outline of a boiling water reactor to which this invention is applied, and also shows the construction of this invention. A core 12 is provided within a reactor pressure vessel 11. Within the reactor pressure vessel 11, a separator and dryer 13 is arranged above the core 12. A plurality of control rods 14 are coupled to a control rod drive device 15. In order to regulate the power of the nuclear reactor, the control rods 14 are inserted into the core 12 and drawn out therefrom by means of the control rod drive device 15. The control rod drive device 15 is connected with a rod control system 16, to manipulate the control rods 14 as stated above. The reactor pressure vessel 11 is filled with a coolant whose level is higher than the core 12. The coolant flows into a plenum 18 below the core 12 and a core shroud 19 around the core 12 by means of a circulation pump 17. The circulation pump 17 is attached to a recycling system pipe 20. Steam generated in such a manner that the coolant is heated by nuclear fuel elements arranged in the core 12, passes through the separator and dryer 13 and is thereafter supplied to a turbine 21. After the steam is condensed by a steam condenser 22, water is returned into the reactor pressure vessel 11 by a feed water pump 23. A dynamo 24 is coupled to the turbine 21. An in-core nuclear detector 25 is inserted into the core 12 to detect the power of the nuclear reactor. The in-core nuclear detector 25 is associated with a timer 26 by a circuit 28, and is further associated with an arithmetic unit 27 by a circuit 29. The rod control system 16 and the arithmetic unit 27 are associated by a circuit 30. The arithmetic unit 27 and the circulation pump 17 are associated by a circuit 48 with a circulation pump control 47 interposed therebetween.

Figure 8:
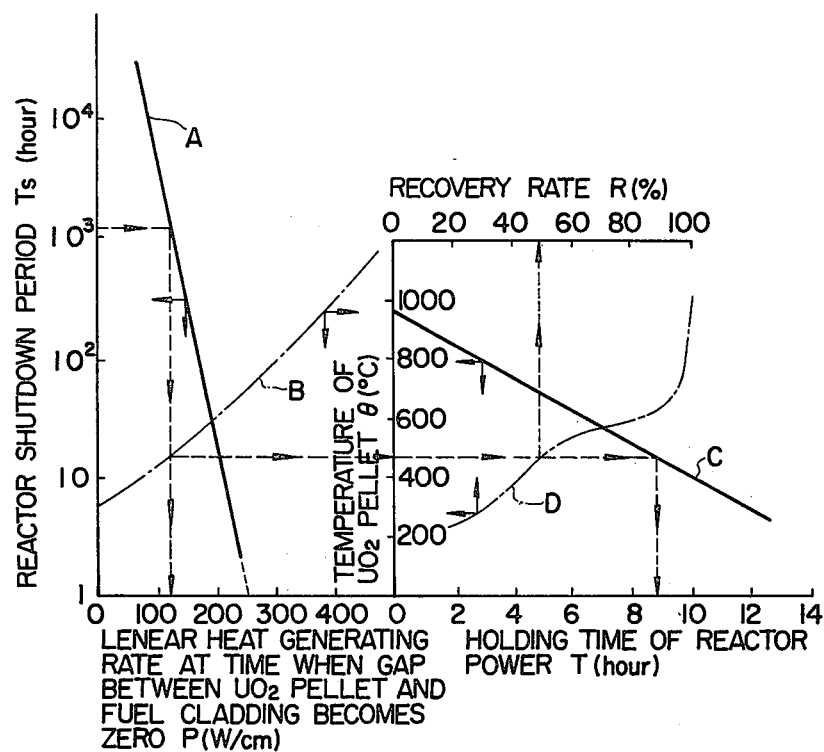
FIG. 8 is an explanatory diagram showing the correspondence between the operating steps conducted by the flow chart of FIG. 7 and the characteristics of FIGS. 1, 4 and 5 as well as a characteristic illustrative of the relationship between the temperature $\theta$ of $UO_2$ pellets and the holding time t of power.
Figure 9:
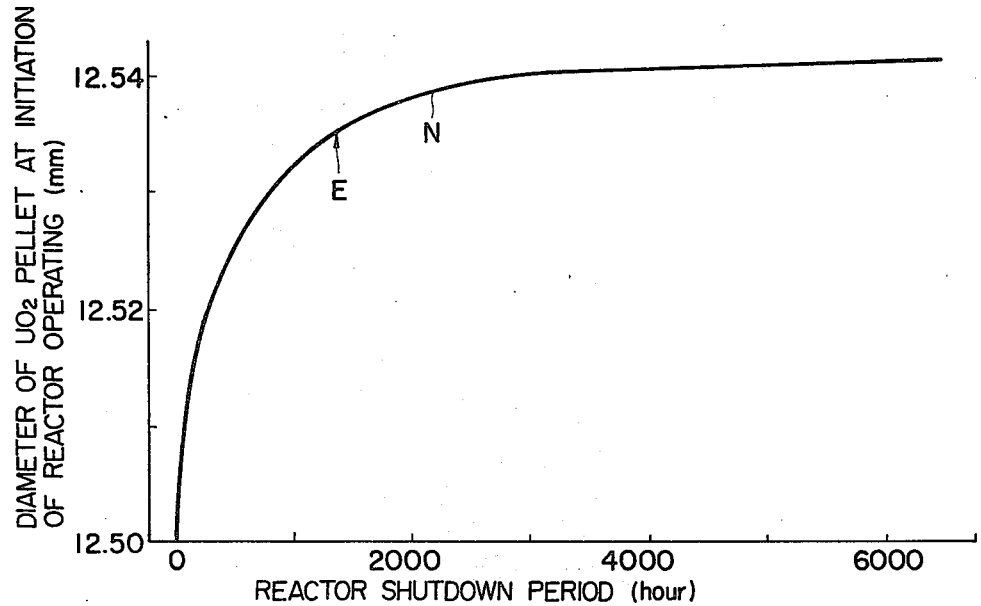
FIG. 9 is a characteristic diagram showing the relationship between the shutdown period of a nuclear reactor and the diameter of a $UO_2$ pellet at the initiation of reactor operating.
Figure 10:
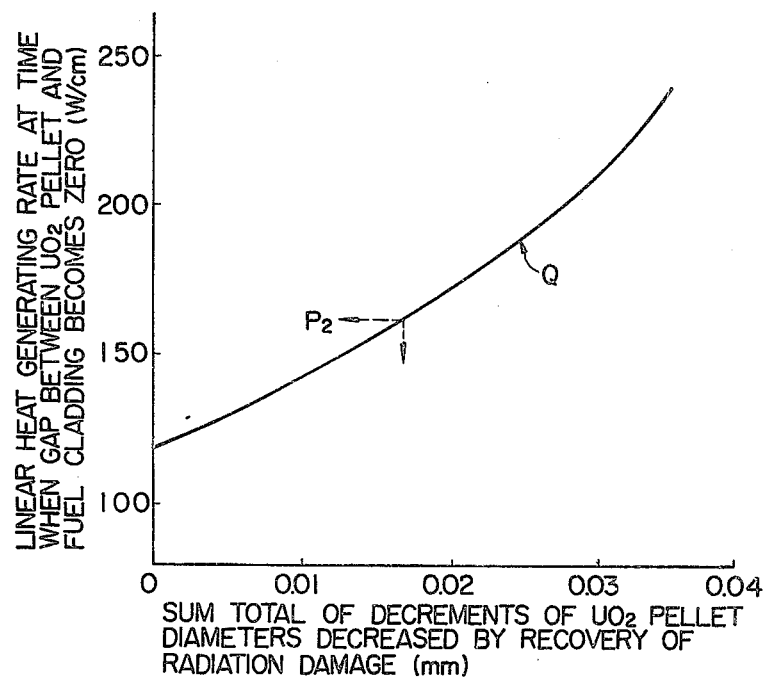
FIG. 10 is a characteristic diagram showing the relationship between the sum total of the decrements of $UO_2$ pellet diameters decreased by the recovery of a radiation damage and the linear heat generating rate at the time when the gap between $UO_2$ pellets and a fuel cladding becomes zero.

The function of this embodiment will be explained by taking as an example a case where the operation of the nuclear reactor is once stopped and where after lapse of a certain time, the nuclear reactor is started again to raise the power. When the power of the nuclear reactor lowers down to zero and the nuclear reactor is shut down, the timer 26 is actuated. When the nuclear reactor is restarted and the power rises from zero, the timer 26 is stopped. That is, the shutdown period of time of the nuclear reactor is measured by the timer 26. Actuating signals for the timer 26 may be actuating signals for shutting down and starting up the nuclear reactor, not signals from the in-core nuclear detector 25. A signal $t_o$ of the shutdown period of the nuclear reactor as measured by the timer 26 is transferred to the arithmetic unit 27 as an input thereof. Upon the transfer of the shutdown period signal $t_o$, the arithmetic unit 27 executes calculations in accordance with a flow chart given in FIG. 7 and conveys the calculated result to the rod control system 16. In response to the signal conveyed from the arithmetic unit 27, the rod control system 16 manipulates the control rod drive device 15 to insert the control rods 14 into the core 12 or to draw out them therefrom. Calculating steps in the arithmetic unit 27 will be explained with reference to FIGS. 7 and 8. A characteristic A shown in FIG. 8 is the characteristic straight line given in FIG. 1, a characteristic B is the characteristic curve given in FIG. 5, and a characteristic D is the characteristic curve given in FIG. 4. A characteristic C represents the relationship between the holding time t of the rector power and the temperature $\theta$ of the UO₂ pellets. A characteristic N shown in FIG. 9 indicates the relationship between the shutdown period of the nuclear reactor and the diameter of the UO₂ pellet 3 at the beginning of the operation of the nuclear reactor. Under the state under which the UO₂ pellet 3 has no distortion, it has a diameter of 12.50 mm. FIG. 10 illustrates the relationship between the sum total of the decrements of diameters of the UO₂ pellets 3 as caused by the recovery of the radiation damage and the linear heat generating rate at which the gap between the fuel cladding 2 and the UO₂ pellet 3 becomes zero. This is an example at the time when the diameter (Di) of the UO₂ pellet 3 is 12.5 mm and the gap (Ga) between the fuel cladding 2 and the UO₂ pellet 3 after the fabrication of the nuclear fuel element is 0.3 mm (in this specification, the term "gap" ($G_a$) is intended to mean the sum of gaps on both the sides, i.e., (inside diameter of fuel cladding-)—(diameter of UO₂ pellet)). Thus, a relationship $G_a/D_i = 0.024$ is provided. The inside diameter of the fuel cladding 2 in the embodiment is 12.80 mm.

A concrete method of operation of this embodiment will be explained with reference to FIG. 8 in conformity with the flow chart of FIG. 7. The reactor shutdown period $T_s$ between the shutdown of the nuclear reactor and the restarting thereof is made 1,440 hours (roughly 2 months) by way of example. The time is measured by the timer 26. The value is transmitted to the arithmetic unit 27 as an input thereof (Step 31). At step 49, the characteristics A, B, C and D in FIG. 8, the characteristics N in FIG. 9 and the characteristics Q in FIG. 10 are received as inputs and stored. The number of times n by which the power of the nuclear reactor is held at fixed levels is received as an input (Step 50). At first, n=1. Subsequently, the linear heat generating rate $P_1$ which corresponds to the power of the nuclear reactor to be held at first is evaluated. That is, the linear heat generating rate $P_1(P_1 = 120$ W/cm$)$ is evaluated from the characteristic A (Step 32). The characteristics A is expressed by the following equation:

$$P = P_o \left(1 - \frac{\ln T_s}{\ln T_{so}}\right) \tag{1}$$

where P denotes the linear heat generating rate which initiates the PCI, $T_s$ denotes the shutdown period of the nuclear reactor, $P_0$ denotes the linear heat generating rate at which the PCI arises for the first time when the nuclear reactor is restarted with its shutdown period being made substantially zero, and $T_{so}$ denotes the shutdown period of the nuclear reactor as required until P=0 is reached in FIG. 1. Subsequently, the temperature $\theta_1$ ($\theta_1=460°$ C.) of the UO$_2$ pellet as corresponds to the linear heat generating rate P$_1$=120 W/cm is evaluated from the characteristic B (Step 33). The holding time T$_1$ (T$_1$=9 hours) of the reactor power as corresponds to the UO$_2$ pellet temperature $\theta_1$=460° C. is evaluated from the characteristic C (Step 34). The characteristic C is expressed by the following equation:

$$T = -K_1\theta + K_2 \quad (2)$$

where T denotes the holding time of the reactor power, $\theta$ denotes the temperature of the UO$_2$ pellet, K$_1$ denotes a constant which is determined by the object of UO$_2$ (in this embodiment, K$_1$=0.01875 hours/° C.), and K$_2$ denotes a constant (in this embodiment, K$_2$=17.625 hours).

Figure 11:
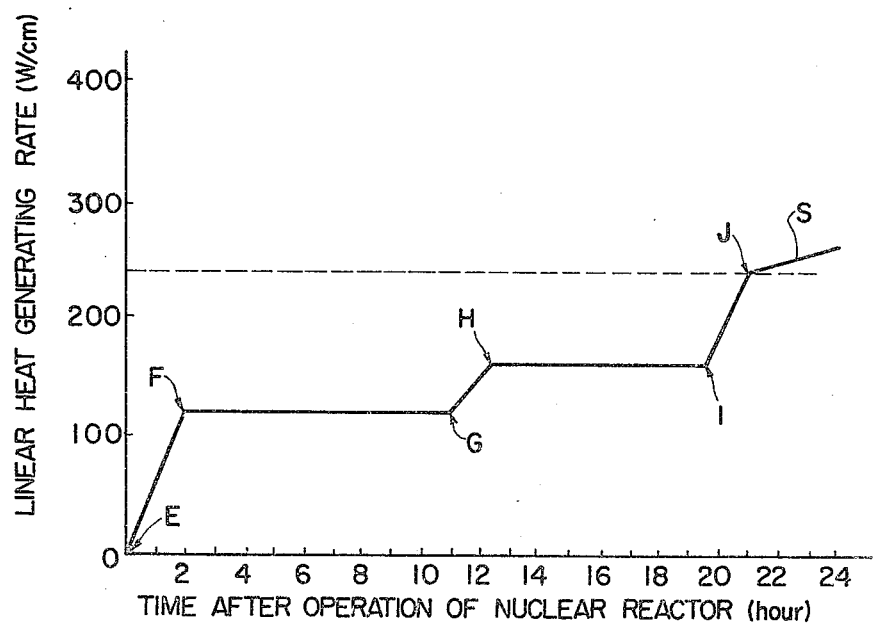
FIG. 11 is an explanatory diagram showing the variation of the power of a nuclear reactor at the time when the power raise of the nuclear reactor is performed by the steps shown in FIG. 7.

When P$_1$ and T$_1$ are evaluated in this way, a linear heat generating rate signal and a holding time signal are transmitted to the rod control system 16 to draw out the control rods 14 (Step 35). When the control rods 14 are drawn out from the core 12 and the linear heat generating rate becomes 120 W/cm, the drawing-out of the control rods 14 is stopped. Whether or not the linear heat generating rate of 120 W/cm has been reached can be known with the in-core nuclear detector 25. Although not shown, a detection signal of the in-core nuclear detector 25 is transferred to the rod control system 16. When the linear heat generating rate arrives at 120 W/cm, the rod control system 16 is stopped to check the control rods 14 from being pulled out. Whether or not an actual power has reached a prescribed one may be judged by introducing the signal of the in-core nuclear detector 25 directly into the arithmetic unit 27. When the linear heat generating rate reaches 120 W/cm, the power of the nuclear reactor is held constant by keeping the linear heat generating rate for about 9 hours (Step 36). In FIG. 11, a section E-F corresponds the period in which the linear heat generating rate is raised up to 120 W/cm, and a section F-G the period during which the linear heat generating rate is held constant at 120 W/cm for 9 hours. Whether or not the holding period of time has reached a predetermined one can be easily confirmed in such a way that a timer (not shown) is actuated when the reactor power becomes constant.

By stopping the power rise of the nuclear reactor and holding the power for the fixed period of time as described above, the radiation damage having arisen in the UO$_2$ pellets 3 is recovered. In contrast to the fact that almost no gap existed between the UO$_2$ pellet 3 and the fuel cladding 2 at the time when the linear heat generating rate was raised to 120 W/cm, the gap between them widens owing to the recovery. How much the radiation damage is recovered is evaluated by Step 39. That is, the recovery rate R$_1$ (R$_1$=48%) of the radiation damage for the UO$_2$ pellets as corresponds to the UO$_2$ pellet temperature $\theta_1$=460° C. is evaluated from the characteristic D of FIG. 8. When the gap widens, it is enabled to raise the linear heat generating rate until the gap becomes zero. Subsequently, R$_1$ is stored at Step 52, and $$\sum_{i=1}^{n} R_i$$

is evaluated at Step 51. That is, the radiation damage is perfectly recovered by holding the power of the nuclear reactor constant n times, and the sum total of the recovery rates R (%) of the radiation damage from the first to n-th holdings is evaluated at Step 51. The holding of the reactor power at the constant level at this time is the first one, and the sum total of the recovery percentage R of the radiation damage as evaluated at Step 51 is 48%. At step 40, there is formed a judgement on whether or not the radiation damage has been recovered by 100% (a judgement on whether or not $$\sum_{i=1}^{n} R_i \geq 100\%$$

is satisfied). Step 40 shifts to Step 44 if the radiation damage has been recovered by 100%, and to Step 41 if not. At this time, it shifts to Step 41. At Step 41, the gap at the point G in FIG. 11 is evaluated. When the nuclear reactor has the operation initiated again after being shut down for 1,440 hours as previously stated, the diameter of the UO$_2$ pellet 3 is about 12.535 mm at the time of the operation initiation as seen from the characteristic N, and the gap is narrower and about 0.265 mm. The UO$_2$ pellet 3 has the diameter increased by about 0.035 mm by the radiation damage. Since about 48% of the radiation damage is recovered in the section F-G in FIG. 11, the diameter of the UO$_2$ pellet 3 at the point G decreases by about 0.0168 mm. That is, the gap between the fuel cladding 2 and the UO$_2$ pellet 3 at the point G amounts to about 0.0168 mm (G$_1$). The characteristic curve N shown in FIG. 9 is expressed as follows:

$$d = K_3 e^{h \cdot T_s} \quad (3)$$

where d denotes the increment of the UO$_2$ pellet diameter ascribable to the radiation damage, and K$_3$ and h denote constants. T$_s$ denotes the shutdown period of time of the nuclear reactor as stated before. Letting d$_0$ be the diameter of the distortionless UO$_2$ pellet 3 after fabrication, (d$_0$+d) is the diameter of the UO$_2$ pellet 3 at the time when the operation of the nuclear reactor is initiated after the reactor shutdown. Letting R$_n$ be the recovery percentage of the radiation damage at the n-th holding of the reactor power at the fixed level, (R$_n$×d) is the gap between the fuel cladding 2 and the UO$_2$ pellet 3 after the radiation damage has been recovered by holding the power of the nuclear reactor constant.

It has been judged at Step 40 that $$\sum_{i=1}^{n} R_i \geq 100\%$$

is not fulfilled. Therefore, the power of the nucler reactor is held constant, whereupon it is raised again up to a power which does not include the PCI. The reactor power which does not include the PCI corresponds to the linear heat generating rate which turns G$_1$=0.0168 into zero. The allowable linear heat generating rate P$_2$ which turns G$_1$=0.0168 into zero can be evaluated from the characteristic Q of FIG. 10(Step 42). The allowable linear heat generating rate P$_2$ is 163 W/cm. After Step 42, whether or not the linear heat generating rate P₂ has reached 240 W/cm is judged (Step 37). If the linear heat generating rate P₂ has reached 240 W/cm, a control signal is transmitted from the arithmetic unit 27 through a circulation pump control system 47 to the circulation pump 17. The rotational frequency of the circulation pump 17 is controlled in response to the control signal. The flow rate of the coolant to be supplied to the core 12 is regulated, the linear heat generating rate is increased in a proportion of below about 1.8 W/cm/hour, and the power of the nuclear reactor is gradually raised (Step 38). Before the linear heat generating rate reaches 240 W/cm, the nuclear fuel elements are held in the sound state without failing even when the control rods 14 are manipulated. In constrast, when the power of the nuclear reactor is changed by manipulating the control rods 14 in the region in which the linear heat generating rate is 240 W/cm or higher, the nuclear fuel elements fail. Now, the linear heat generating rate P₂ has not yet reached 240 W/cm, so that Step 43 is shifted to. At Step 43, the substitution of $n=n+1$ is executed. At the succeeding steps, there are evaluated the holding time T₂ for keeping the reactor power constant and the recovery percentage R₂ of the radiation damage at the second holding. Upon completion of Step 42, the calculations of Steps 33 and 34 are executed again via Step 43, and the holding time T₂ of the reactor power is evaluated (T₂≈7.5 hours). By Steps 35 and 36, the power of the nuclear reactor is manipulated so as to establish the prescribed linear heat generating rate P₂ and holding time T₂. That is, the reactor power is adjusted along G–H–I in FIG. 11. Since the temperature $\theta_2$ of the UO₂ pellet 3 at the point I is about 540° C., the recovery rate R₂ of the radiation damage inflicted on the UO₂ pellet 3 is about 69% (Step 39). At Step 52, the recovery percentage R₂ is stored. At Step 51, the sum total of the recovery rates R₁ and R₂ is evaluated. The sum total becomes (R₁+R₂)=117%, and the condition of $$\sum_{i=1}^{n} R_i \geq 100\%$$

is met (Step 40). At the point I, the radiation damage of the UO₂ pellet 3 is perfectly recovered. The substitution of $n=n+1$ is made (Step 44), and P₃=240 W/cm is established (Step 45). A signal is transmitted from the arithmetic unit 27 to the rod control system 16, and the control rods 14 are drawn out from the core 12. Owing to this manipulation, the linear heat generating rate rises to 240 W/cm, and a point J in FIG. 11 is reached. The subsequent power raise of the nucler reactor is performed by Step 38 in conformity with the operating rule which has previously been described. After the point J is reached, the power rises as indicated by a straight line S in FIG. 11.

By operating the nuclear reactor as set forth above, the power of the nuclear reactor can be raised as the nuclear fuel elements are kept in the sound state without causing the PCI. In particular, the method of operating the nuclear reactor is the most suitable for preventing the failure of the nuclear fuel elements in such case where the reactor power is raised after suspending the operation of the nuclear reactor. Moreover, according to the present embodiment, the failure of the nuclear fuel elements can be simply suppressed.

Figure 7:
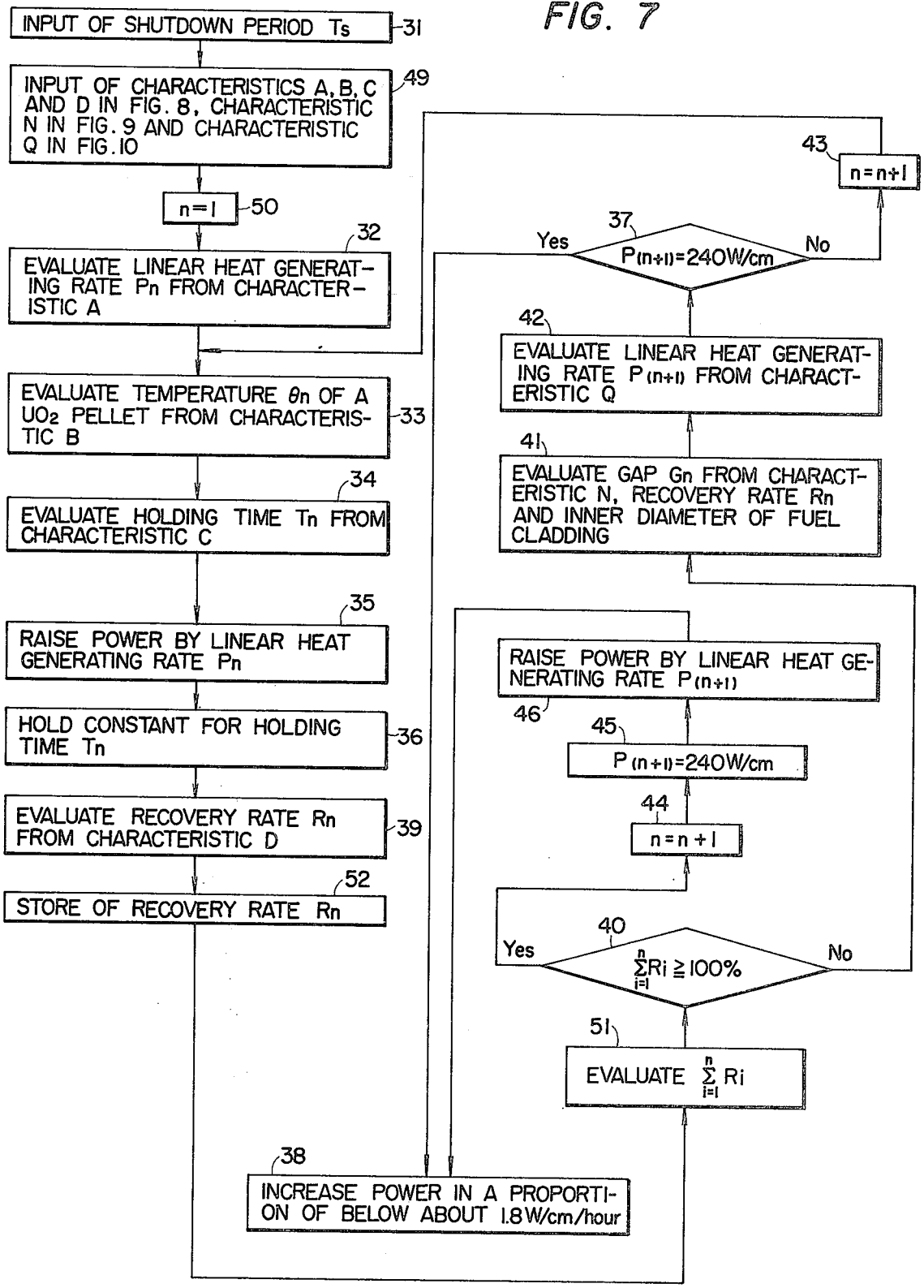
FIG. 7 is a flow chart showing the operating steps which are conducted in an arithmetic unit shown in FIG. 6.

It is also possible to remove Steps 40, 44, 45 and 46 indicated in FIG. 7 and to shift from Step 39 to Step 41. In such case, when the linear heat generating rate evaluated at Step 42 exceeds 240 W/cm sharply, it is apprehended that the rule of the power raise at Step 38 cannot be conformed with in the exceeding range. This is attended with the danger of the failure of the nuclear fuel elements.

In the foregoing embodiment, when the linear heat generating rate is raised to 240 W/cm, the power adjustment is conducted by only the manipulation of the control rods 14. The power regulation of the nuclear reactor may also be conducted by increasing or decreasing the flow rate of the coolant flowing through the recycling system piping 20, i.e., by varying the rotational frequency of the circulation pump 17. According to the variation of the flow rate of the coolant, the power regulation of the nuclear reactor can be conducted more smoothly than with the control rods 14 and without giving rise to the fluctuation of the power distribution. That is, control rod manipulation results in coarse regulation while coolant rate variation results in fine regulation. In this case, the manipulation is enabled in such a way that the signal from the arithmetic unit 27 is transmitted to the circulation pump control system 47 which effects the regulation of the rotational frequency of the circulation pump 17. It is also possible to carry out the power adjustment by both the manipulation of the control rods 14 and the variation of the coolant flow rate by restricting the respective power regulating ranges.

The values of the linear heat generating rates P₁ and P₂ in the foregoing embodiment may be smaller than the values obtained from the characteristic A (characteristic Q). Likewise, the values of the holding times T₁ and T₂ may be greater than the values obtained from the characteristic C. However, when the linear heat generating rates and the holding times are made such values, the period of time required for the power raise of the nuclear reactor becomes longer. When the values of the linear heat generating rates and the holding times as obtained on the basis of the characteristics A and C are employed, the reactor power can be raise up to a set power without inducing the failure of the nuclear fuel elements and in a short time.

The calculations of STeps 33, 34, 35, 36, 37, 39, 41, 42 and 43 indicated in FIG. 7 are repeated until the radiation damage of the UO₂ pellets 3 is perfectly recovered. The number of times of the repetition differs in dependence on the reactor shutdown period of time, the shape of the UO₂ pellet, and the gap between the UO₂ pellet and the fuel cladding at fabrication. Although the above embodiment has been described on the basis of the linear heat generating rate, it may also be considered on the basis of the reactor power. The reactor power and the linear heat generating rate are in a proportional relationship. Since the conversion of units is possible, it can be easily carried out to express the linear heat generating rate in any unit other than W/cm.

The foregoing embodiment is also applicable to nuclear reactors other than the boiling water reactor, i.e., a pressurized water reactor, a fast breeder and a heavy water moderated reactor.

The nuclear fuel element of the fast breeder contains plutonium. The fuel pellet therefore sustains the self-irradiation damage before the nuclear reactor is started for the first time by molding the fuel pellet and packing it into the fuel cladding and then loading the nuclear reactor with the nuclear fuel element. The foregoing embodiment is applicable, not only when the nuclear reactor is restarted, but also when it is started for the first time to have the power raised.

In accordance with this invention, when the power of the nuclear reactor is raised, the failure of the nuclear fuel element can be prevented, and the nuclear reactor can be safely operated.

What is claimed is:

1. A method of operating a nuclear reactor during the period when power of the nuclear reactor is raised, comprising the steps of raising the power from zero W/cm after reactor shutdown up to 240 W/cm of a linear heat generating rate of nuclear fuel elements containing $UO_2$ fuel pellets surrounded by a zirconium alloy and located in a core of the nuclear reactor utilizing a first control means providing coarse power regulation, raising the power of the nuclear reactor in a range over the linear heat generating rate 240 W/cm utilizing a second control means providing fine power regulation, and stopping the power rise to the nuclear reactor and holding the power at a fixed level at least once in a range below a linear heat generating rate corresponding to a length of a shutdown period of time of said nuclear reactor before the linear heat generating rate reaches 240 W/cm, and wherein the power of said reactor is held constant at least once somewhere in the range zero to P which satisfies the relation $$P \leq P_o(1 - \frac{l_n T_s}{l_n T_{so}}),$$

where P is a linear heat generating rate at which said nuclear fuel elements initiate the Pellet Clad Mechanical Interaction; $T_s$ is the shutdown period of the reactor; $P_0$ is a linear heat generating rate which causes said nuclear fuel elements to induce Pellet Clad Mechanical Interaction for the first time, after said reactor is restarted when the reactor shutdown period $T_s$ is zero; and $T_{so}$ is the reactor shutdown period when P=0.

2. The method of operating a nuclear reactor according to claim 1, wherein the power of said nuclear reactor is raised by pulling out from said core, control rods which are the first control means and are inserted therein.

3. The method of operating the nuclear reactor according to claim 1, wherein letting T denote a period of time during which the power of the nuclear reactor is held constant, $\theta$ denote a temperature of fuel pellets in said nuclear fuel elements, $K_1$ denote a constant of proportion, $K_2$ denote a constant, the power of the nuclear reactor is held constant for the holding period of time which satisfies $$T \geq -K_1\theta + K_2.$$

4. The method of operating a nuclear reactor according to claim 3, wherein the power of the nuclear reactor is held constant for the holding period of time which satisfies $$T \geq -0.01875\,\theta + 17.625.$$

5. The method of operating a nuclear reactor according to claim 1, wherein said linear heat generating rate is increased by varying a flow rate of a coolant to be supplied to said core.

6. The method of operating the nuclear reactor according to claim 1, wherein when the linear heat generating rate of said nuclear fuel elements has become at least 240 W/cm, the linear heat generating rate is increased in a proportion of at most about 1.8 W/cm/hour, to raise the power of the nuclear reactor.

7. The method of operating a nuclear reactor according to claim 1, wherein the fuel pellets and the surrounding zirconium alloy satisfy the relation $$G_a/D_i = 0.024$$

where $D_i$ is a diameter of the fuel pellet and $G_a$ is the sum of gaps between the zirconium alloy and the pellet.

8. A method of operating a nuclear reactor during the period when power of the nuclear reactor is raised, comprising the steps of raising the power from zero W/cm after reactor shutdown up to 240 W/cm of a linear heat generating rate of nuclear fuel elements containing $UO_2$ fuel pellets surrounded by a zirconium alloy and located in a core of the nuclear reactor by manipulating control rods, raising the power of the nuclear reactor in a range over the linear heat generating rate of 240 W/cm by a coolant control means for controlling a flow rate of a coolant supplied to the core, and stopping the power rise of the nuclear reactor and holding the power at a fixed level at least once in a range below a linear heat generating rate corresponding to a length of a shutdown period of time of the nuclear reactor before the linear heat generating rate reaches 240 W/cm, and wherein the power of said reactor is held constant at least once somewhere in the range zero to $P_1$ which satisfies the relation $$P \leq P_o (1 - \frac{\ln T_s}{\ln T_{so}}),$$

where $P_1$ is a linear heat generating rate at which said nuclear fuel elements initiate the Pellet Clad Mechanical Interaction; $T_s$ is the shutdown period of the reactor; $P_o$ is a linear heat generating rate which causes said nuclear fuel elements to induce Pellet Clad Mechanical Interaction for the first time, after said reactor is restarted when the reactor shutdown period $T_s$ is zero; and $T_{so}$ is the reactor shutdown period when P=0.

9. The method of operating the nuclear reactor according to claim 8, wherein the power of the nuclear reactor is held constant for the holding period of time which satisfies $$T \geq -0.01875\theta + 17.625.$$

10. The method of operating the nuclear reactor according to claim 8, wherein after the linear heat generating rate of said nuclear fuel elements has become at least 240 W/cm, the linear heat generating rate is increased in a proportion of at most about 1.8 W/cm/hour, to raise the power of the nuclear reactor.

11. The method of operating a nuclear reactor according to claim 8, wherein the fuel pellets and the surrounding zirconium alloy satisfy the relation $$G_a/D_i = 0.024$$

where $D_1$ is a diameter of the fuel pellet and $G_a$ is the sum of gaps between the zirconium alloy and the pellet.

12. The method of operating the nuclear reactor according to claim 8, wherein the power of said nuclear reactor is held constant for a period of time which satisfies the relation $$T \geq -K_1\theta + K_2,$$

where T is the period of time during which said reactor is held constant, $\theta$ is a temperature of $UO_2$ pellets in said nuclear fuel elements, $K_1$ is a constant of proportion and $K_2$ is another constant.

13. The method of operating the nuclear reactor according to claim 12, wherein the power of the nuclear reactor is held constant for the holding period of time which satisfies $$T \geq -0.01875\theta + 17.625.$$

14. The method of operating the nuclear reactor according to claim 12, wherein the power of the reactor is held constant at a linear heat generating rate $P_1$ which satisfies the relation $$P_1 = P_o(1 - \frac{\ln T_s}{\ln T_{so}}),$$

for a period of time T which satisfies the relation $$T = -K_1\theta + K_2.$$

15. The method of operating a nuclear reactor according to claim 14, wherein the power of the nuclear reactor is held constant for the holding period of time which satisfies $$T = -0.01875\theta + 17.625.$$

16. The method of operating a nuclear reactor according to claim 12, wherein a recovery percentage $R_n$ of self-irradiation damage of said $UO_2$ pellets, which depends on the temperature $\theta_n$ of said $UO_2$ pellets, is evaluated, and wherein when $$\sum_{i=1}^{n} R_i \geq 100\%$$

is established, the linear heat generating rate of the nuclear fuel elements packed in the core is raised to 240 W/cm, where n represents the number of times which the power is held at a fixed level.

17. The method of operating a nuclear reactor according to claim 16, wherein after the linear heat generating rate of said nuclear fuel elements has reached at least 240 W/cm, said linear heat generating rate is increased at most about 1.8 W/cm/hour, to raise the power of said nuclear reactor.

18. The method of operating the nuclear reactor according to claim 16, wherein when $$\sum_{i=1}^{n} R_i < 100\%,$$

a linear heat generating rate $P_{(n+1)}$, which depends on the temperature $\theta_n$ of said $UO_2$ pellets and which renders zero the width of the gap between said $UO_2$ pellets and a fuel cladding of said nuclear fuel elements, is evaluated, and wherein when $P_{(n+1)} \geq 240$ W/cm, the linear heat generating rate of said nuclear fuel elements packed in said core is raised by the coolant control means.

19. The method of operating a nuclear reactor according to claim 18, wherein when $P_{(n+1)} \geq 240$ W/cm, the linear heat generating rate of the nuclear fuel elements packed in the core is raised to 240 W/cm.

20. The method of operating a nuclear reactor according to claim 18, wherein after the linear heat generating rate of said nuclear fuel elements has reached at least 240 W/cm, said linear heat generating rate is increased at most about 1.8 W/cm/hour, to raise the power of said nuclear reactor.

21. The method of operating a nuclear reactor according to claim 18, wherein when $P_{(n+1)} \geq 240$ W/cm, the power of the nuclear reactor is raised up to the linear heat generating rate $P_{(n+1)}$, whereupon the power of the nuclear reactor is held there for a fixed period of time.

22. A method of operating a nuclear reactor during the period when power of a nuclear reactor is raised so as to prevent Pellet Clad Mechanical Interaction of the fuel elements, comprising the steps of raising the power of the reactor by a first control means providing coarse power regulation from a linear heat generating rate of zero W/cm after reactor shutdown up to a linear heat generating rate of nuclear fuel elements containing oxide fuel pellets surrounded by a zirconium alloy and located in a core of the reactor which is an upper limit of operation of the first control means, raising the power of the reactor above the linear heat generating rate of the upper limit of operation of the first control means by a second control means for providing fine power regulation; and preventing Pellet Clad Mechanical Interaction of the fuel elements during the raising of the power of the reactor by stopping the raising of the power of the reactor and maintaining the power constant at least once in a range below a linear heat generating rate corresponding to a length of a shutdown period of the reactor before the linear heat generating rate reaches the upper limit of operation of the first control means, and wherein the power of said reactor is held constant at least once somewhere in the range zero to P which satisfies the relation $$P \leq P_o(1 - \frac{l_n T_s}{l_n T_{so}}),$$

where P is a linear heat generating rate at which said nuclear fuel elements initiate the Pellet Clad Mechanical Interaction; $T_s$ is the shutdown period of the reactor; $P_o$ is a linear heat generating rate which causes said nuclear fuel elements to induce Pellet Clad Mechanical Interaction for the first time, after said reactor is restarted when the reactor shutdown period $T_s$ is zero; and $T_{so}$ is the reactor shutdown period when P=0.

23. The method of operating a nuclear reactor according to claim 22, wherein the upper limit of operation of the first control means is 240 W/cm, and after the linear heat generating rate of said nuclear fuel elements has reached at least 240 W/cm, the linear heat generating rate is increased by the second control means at most about 1.8 W/cm/hour, to raise the power of said nuclear reactor.

24. The method of operating a nuclear reactor according to claim 23, wherein the first control means for providing a coarse power regulation includes control rods and manipulating the control rods to raise the power of the reactor up to the linear heat generating rate which is an upper limit of operation of the control rods, the second control means providing fine power regulation including coolant control means and controlling the flow rate of a coolant supplied to the core for raising the power above the linear heat generating rate of the upper limit of operation of the first control means.

25. The method of operating a nuclear reactor according to claim 22, wherein the fuel pellets and the surrounding zirconium alloy satisfy the relation $$G_a/D_i = 0.024$$

where $D_i$ is a diameter of the fuel pellet and $G_a$ is the sum of gaps between the zirconium alloy and the pellet.

26. The method of operating the nuclear reactor according to claim 22, wherein the power of said nuclear reactor is held constant for a period of time which satisfies the relation $$T \geq -K_1\theta + K_2,$$

where T is the period of time during which said reactor is held constant, $\theta$ is a temperature of fuel pellets in said nuclear fuel elements, $K_1$ is a constant of proportion and $K_2$ is another constant.

27. The method of operating the nuclear reactor according to claim 26, wherein the power of the nuclear reactor is held constant at a linear heat generating rate $P_1$ which satisfies the relation $$P_1 = P_o\left(1 - \frac{\ln T_s}{\ln T_{so}}\right),$$

for a period of time T which satisfies the relation $$T = -K_1\theta + K_2.$$

28. The method of operating a nuclear reactor according to claim 26, wherein the power of the nuclear reactor is held constant for the holding period of time which satisfies $$T \geq -0.0187\theta + 17.625.$$

29. The method of operating the nuclear reactor according to claim 26, wherein a recovery percentage $R_n$ of self-irradiation damage of said fuel pellets, which depend on the temperature $\theta$ of said fuel pellets, is evaluated, and wherein when $$\sum_{i=1}^{n} R_i \geq 100\%$$

is established, the linear heat generating rate of said nuclear fuel elements packed in said core is raised to the linear heat generating rate which is the upper limit of operation of said first control means, where n represents the number of times which the power is held at a fixed level.

30. The method of operating a nuclear reactor according to claim 29, wherein when $$\sum_{i=1}^{n} R_i < 100\%,$$

a linear heat generating rate $P_{(n+1)}$, which depends on the temperature $\theta_n$ of said fuel pellets and which renders zero the width of a gap between said fuel pellets and a fuel cladding of said nuclear fuel elements, is evaluated, and wherein when $P_{(n+1)} \geq$ (the linear heat generating rate which is the upper limit of operation of the first control means), the linear heat generating rate of said nuclear fuel elements packed in said core is raised by the second control means.

31. The method of operating a nuclear reactor according to claim 30, wherein when $P_{(n+1)} \geq$ (the linear heat generating rate which is the upper limit of operation of the first control means), the linear heat generating rate of said nuclear fuel elements packed in the core is raised to the upper limit of operation of the first control means.

32. The method of operating a nuclear reactor according to claim 30, wherein when $P_{(n+1)} <$ (the linear heat generating rate which is the upper limit of operation of the first control means), the power of said nuclear reactor is raised up to said linear heat generating rate $P_{(n+1)}$, whereupon the power of said nuclear reactor is held there for a fixed period of time.

33. The method of operating the nuclear reactor according to claim 32, wherein the first control means for providing a coarse power regulation includes control rods and manipulating the control rods to raise the power of the reactor up to the linear heat generating rate which is an upper limit of operation of the control rods, the second control means providing fine power regulation including coolant control means and controlling the flow rate of a coolant supplied to the core for raising the power above the linear heat generating rate of the upper limit of operation of the first control means.

34. The method of operating a nuclear reactor according to claim 33, wherein the upper limit of operation of the first control means is 240 W/cm, and after the linear heat generating rate of said nuclear fuel elements has reached at least 240 W/cm, the linear heat generating rate is increased by the second control means at most about 1.8 W/cm/hour, to raise the power of said nuclear reactor.

* * * * *